United States Patent [19]

Takeuchi et al.

[11] 4,125,825
[45] Nov. 14, 1978

[54] SYSTEM FOR DETECTING A FAILURE IN A VEHICLE VELOCITY DETECTOR AND A WHEEL VELOCITY DETECTOR

[75] Inventors: Yasuhisa Takeuchi, Yokosuka; Kenji Maio, Hinode; Junichiro Matsumoto, Yokosuka, all of Japan

[73] Assignees: Nissan Motor Company, Ltd.; Hitachi, Ltd., both of Japan

[21] Appl. No.: 680,865

[22] Filed: Apr. 27, 1976

[30] Foreign Application Priority Data

Apr. 30, 1975 [JP] Japan .................................. 50-51393

[51] Int. Cl.² ............................................... B60T 8/10
[52] U.S. Cl. .................................. 340/52 B; 303/92; 340/670; 361/242
[58] Field of Search ................. 340/52 B, 262, 263; 180/105 E; 303/92, 93, 101, 103; 324/160, 161; 361/238, 239, 242

[56] References Cited

U.S. PATENT DOCUMENTS

| 3,667,812 | 6/1972 | Carp et al. ......................... 303/92 |
| 3,701,568 | 10/1972 | Lewis et al. ....................... 303/109 |
| 3,759,582 | 9/1973 | Ohta et al. ......................... 303/92 |
| 3,863,993 | 2/1975 | Fleisher et al. .................... 303/92 |
| 3,920,280 | 11/1975 | Luhdorff et al. ................... 303/92 |
| 3,944,288 | 3/1976 | Bertolasi .......................... 340/52 B |
| 3,964,796 | 6/1976 | Brener .............................. 303/92 |
| 4,046,426 | 9/1977 | Miyake ............................. 303/100 |
| 4,073,545 | 2/1978 | Takeuchi et al. ................... 303/109 |

*Primary Examiner*—Donald J. Yusko
*Assistant Examiner*—Joseph E. Nowicki
*Attorney, Agent, or Firm*—Craig & Antonelli

[57] ABSTRACT

In an automatic brake controller having a vehicle velocity detector for detecting vehicle velocity and a wheel velocity detector for detecting wheel velocity, a failure detecting system is provided for the vehicle velocity detector and the wheel velocity detector. A comparator which makes a comparison between the vehicle velocity signal obtained from said vehicle velocity detector and the wheel velocity signal obtained from said wheel velocity detector generates a predetermined output signal when the difference between both the output signals of said detectors exceeds a predetermined value, and a logical circuit is responsive to said output signal from said comparator to provide a failure signal when a signal representative of a normal transit condition is being generated.

7 Claims, 6 Drawing Figures

SYSTEM FOR DETECTING A FAILURE IN A VEHICLE VELOCITY DETECTOR AND A WHEEL VELOCITY DETECTOR

BACKGROUND OF THE INVENTION

The present invention relates to automatic brake control systems for vehicles, and is particularly applicable to brake systems for automobiles.

This invention relates move particularly to a failure detecting system for detecting failures of a vehicle velocity detector and a wheel velocity detector forming part of a vehicle brake controlling device which performs control over the vehicle brake system on the basis of a comparison of the vehicle velocity signal and wheel velocity signal derived from the vehicle velocity detector and the wheel velocity detector provided in the vehicle.

In automatic brake control systems for automobiles, there has heretofore been provided an anti-skid controller in which the slip state of the wheel during braking is detected by making use of the vehicle velocity signal and the wheel velocity signal derived from a vehicle velocity detector and a wheel velocity detector, and a braking device is controlled on the basis of a comparison of these detected signals whereby the wheel is prevented from being braked too severely or locked causing the vehicle to undergo a sideslip or a so-called skid by temporarily releasing the brakes when such conditions are detected.

The anti-skid controller performs a comparison of the output signals from the vehicle velocity detector and the wheel velocity detector in comparison means during braking and determines from this comparison whether the wheel velocity has lowered beyond a certain predetermined proportion relative to the vehicle velocity. When this condition is detected, it is assumed that the wheel slips, and therefore, an output signal "0" is generated from the comparison means to an AND gate which serves to prevent the actuating signal for the braking system from being delivered by the AND gate even though the braking signal is being received at that time. Thus, the braking force on the vehicle is immediately released.

With such a controller, however, where a failure or other malfunction occurs in the vehicle velocity detector or the wheel velocity detector, a dangerous condition is established. When the vehicle velocity detector fails in some way so that the vehicle velocity signal is not provided or its output level or output frequency is extremely low as compared with a normal value, or where the wheel velocity detector fails so that the wheel velocity signal is abnormally high as compared with a normal value, the level of frequency of the wheel velocity signal exceeds that of the vehicle velocity signal even when the slipping occurs during braking. The output signal of the comparison means accordingly holds a state "1", so that the antiskid controller does not function and the dangerous operating condition of the vehicle is not corrected.

Conversely, where the wheel velocity detector fails in such a way that the wheel velocity signal is not provided or its output level or output frequency is extremely low as compared with a normal value, or where the vehicle velocity detector fails so that the output level or output frequency of the vehicle velocity signal is abnormally high as compared with a normal value, the output signal of the comparison means becomes "0" notwithstanding the fact that no slipping is actually occurring. Thus, during braking under these conditions, the braking device becomes quite inactive, producing a dangerous condition.

SUMMARY OF THE INVENTION

It is the principal object of this invention to provide a failure detecting system which detects failures of a vehicle velocity detector and a wheel velocity detector in an anti-skid controller for vehicles so as to avoid dangers, resulting from malfunction of this controller, such as skidding and runaway of the vehicle.

Another object of this invention is to provide a failure detecting system which makes it possible to precisely detect failures of the detectors in the anti-skid controller without being affected by the failures of the detectors or external noises for a short time.

In order to accomplish such objects, this invention is directed to a failure detecting system comprising a vehicle velocity detector which detects vehicle velocity, a wheel velocity detector which detects wheel velocity, comparison means to compare the output signals of the detectors and to generate a predetermined comparison output signal when the difference between both the output signals exceeds a predetermined value, signal means to generate a signal representative of a normal transit condition, and logical means to generate a predetermined failure detection signal when the comparison output signal from the comparison means and the signal from the signal means are simultaneously received.

Further, this invention provides a failure detecting system comprising timer means to generate an output signal when the failure detection signal from the logical means continues for a prescribed period of time.

DETAILED DESCRIPTION OF THE INVENTION

Figure 1:
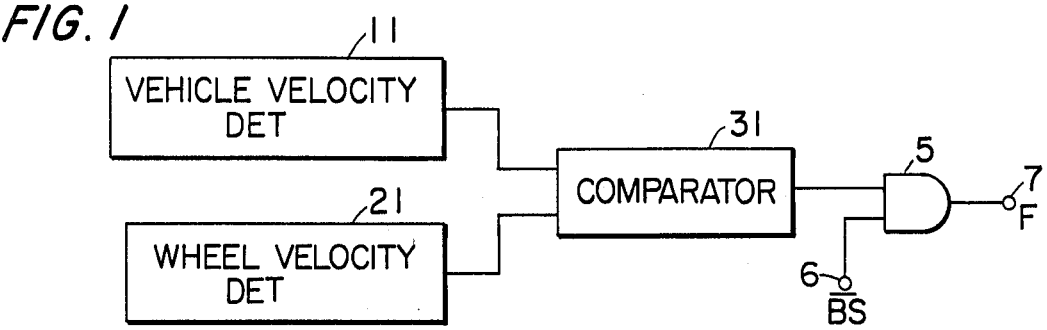
FIG. 1 is a circuit diagram of an embodiment of the failure detecting system according to this invention.

FIG. 1 shows an embodiment of the failure detecting system according to this invention. In the figure, a vehicle velocity detector 11 detects vehicle velocity and provides an analog signal having a level proportional thereto or a digital signal having a frequency proportional thereto, a wheel velocity detector 21 detects wheel velocity in the form of an analog signal having a level proportional thereto or a digital signal having a frequency proportional thereto, and a comparator 31 which is connected to the vehicle velocity detector 11 and the wheel velocity detector 21 compares the outputs of the detectors and generates an output signal "1" in case where the output level or the output frequency of the vehicle velocity detector 11 is higher than that of the wheel velocity detector 21 by a predetermined level or more. A signal representative of the condition of non-braking, i.e., a signal $\overline{BS}$ representing the braking signal BS inverted, is applied to one input terminal 6 of an AND circuit 5 which is connected by its other input to the output of comparator 31. The AND circuit 5 performs the logical product between the signals applied to its input, and applies to an output terminal 7 an output in the form of a failure detection signal.

Figure 6:
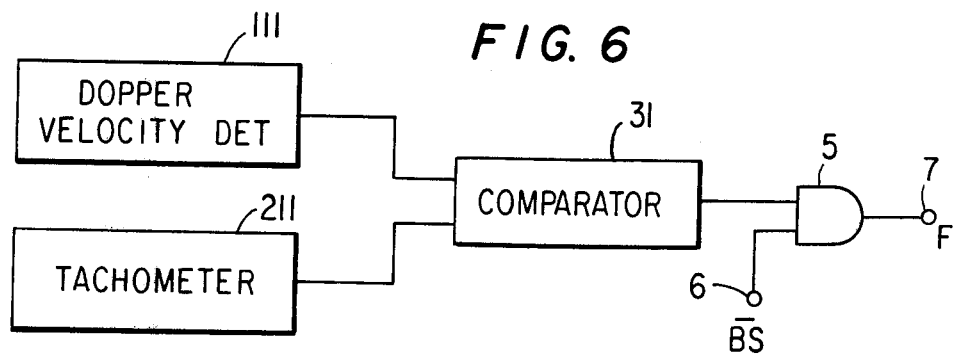
FIG. 6 is a circuit diagram showing a specific example of the use of a Doppler velocity detector and tachometer in this invention.

The vehicle velocity detector 11 may be provided, for example, in the form of a speed meter employing the Doppler system 111, and the wheel velocity detector 21 may comprise, for example, a tachometer 211 attached to a wheel axis as shown in FIG. 6. Needless to say, however, the invention is not restricted to such devices but any means which can provide signals proportional to the vehicle velocity or the wheel velocity may be used.

In such a system as illustrated in FIG. 1, where the level or frequency of the vehicle velocity signal output from the vehicle velocity detector 11 is abnormally high beyond a value set by the comparator 31 as compared with that of the wheel velocity signal output from the wheel velocity detector 21, the output of the comparator 31 becomes "1". More specifically, the output "1" may be generated from the comparator 31 when the wheel velocity signal becomes, for example, below 80 percent of the vehicle velocity signal.

On the other hand, the signal $\overline{BS}$, representing the braking signal $\overline{BS}$ inverted, is applied to the input terminal 6 of AND circuit 5, the logical product between the signal $\overline{BS}$ and the output signal from the comparator 31 is provided by the AND circuit 5, and the logical product output is applied to the output terminal 7. The signal $\overline{BS}$ is a signal which represents the conditions of non-braking, i.e., the condition of normal transit. By observing the output of the output terminal 7, accordingly, it is detectible during normal transit when the output of the vehicle velocity detector 11 is abnormally too high or when the output of the wheel velocity detector 21 is abnormally too low.

In contrast, when the comparator 31 is so constructed as to produce an output "1" in the case where the level or frequency of the wheel velocity signal is abnormally high as compared with that of the vehicle velocity signal, the opposite condition in which the output of the vehicle velocity detector 11 is abnormally too low or the output of the wheel velocity detector 21 is abnormally too high is detectible during normal transit.

When the comparator 31 is so constructed as to produce an output "1" in the case where the level or frequency of the wheel velocity signal is remarkably low or remarkably high as compared with that of the vehicle velocity signal, all malfunctions of the vehicle velocity detector and the wheel velocity detector can be detected by the single comparator.

In this manner, the circuit of FIG. 1 detects failure in the anti-skid controller in the case where such failure occurs during non-braking, i.e., at the normal transit, and can distinguish such failure from the condition which arises due to the lowering of the wheel velocity ascribable to slipping of the wheel during braking.

Although, in the circuit of FIG. 1, the AND circuit 5 is connected to the output of the comparator 31, AND circuits may be respectively disposed between the detectors 11 and 21 and the inputs to the comparator 31 so as to pass the signals from the detectors to the comparator 31 only at the time of braking.

Figure 2:
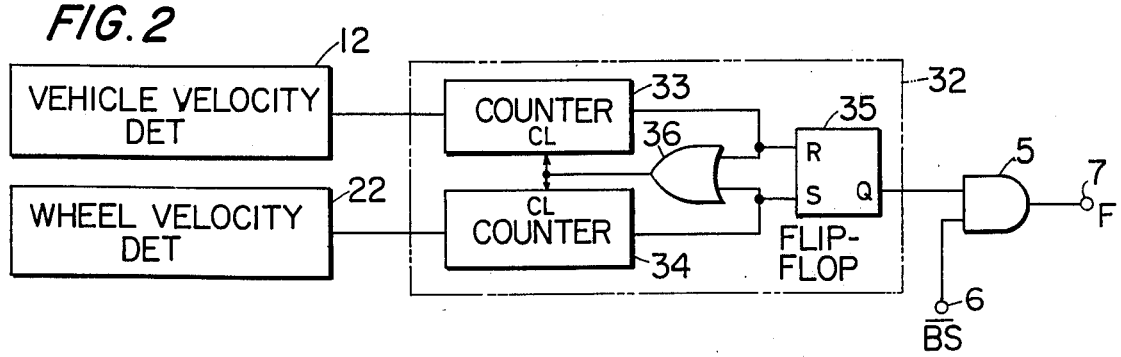
FIG. 2 is a circuit diagram showing a specified example of a comparator which may be used with the failure detecting system according to this invention.

FIG. 2 shows a specific example of a comparator which may be used in the failure detecting system according to this invention. The vehicle velocity detector 12 and the wheel velocity detector 21 provide alternate signals at frequencies proportional to vehicle velocity and wheel velocity, respectively. A comparator 32 compares the frequencies of the vehicle velocity and wheel velocity signals obtained from the detectors 12 and 22 and generates an output signal "1" in the case where the frequency of the vehicle velocity signal is conspicuously lower than that of the wheel velocity signal.

The comparator 32 includes counters 33 and 34, an OR circuit 36, and a flip-flop 35. The counters 33 and 34 receive the outputs of the detectors 12 and 22, respectively. Outputs of the counters 33 and 34 are respectively applied to the reset terminal R and the set terminal S of the flip-flop 35, and they are also applied to respective inputs of the OR circuit 36. The output of the OR circuit 36 is applied in common to the clear terminals CL of the counters 33 and 34 as a clear signal. A signal at an output terminal Q of the flip-flop 35 is applied to one input of an AND circuit 5.

Each of the counters 33 and 34 comprises a plurality of stages. The counters count the pulses of the signals received from the detectors 12 and 22, and they produce outputs when the count values therein reach respective predetermined values. The predetermined count value of the counter 33 is set to be smaller than that of the counter 34. In order to provide the required outputs when the counters 33 and 34 reach the respective predetermined count values, logical combinations of the outputs from the various stages of the respective counters may be taken in the well known manner.

Signals at an identical frequency will be provided from the detectors 12 and 22 when the vehicle velocity and the wheel velocity coincide. Thus, with the system of FIG. 2, where the detectors are operating properly, in other words, where the vehicle velocity signal frequency is not considerably lower than the wheel velocity signal frequency, the counter 33 reaches its predetermined count value earlier than the counter 34, and the output signal "1" from the counter 33 is applied to the reset terminal R of the flip-flop 35 to reset it. Simultaneously therewith, the output signal "1" clears the counters 33 and 34 through the OR circuit 36. As the result, the signal at the output terminal Q of the comparator 32 becomes "0", and no indication of any failure is provided at terminal 7.

In contrast, where failure occurs in the vehicle velocity detector 12 so that the frequency of the output signal becomes markedly lower than the normal value, or where failure occurs in the wheel velocity detector 22 so that the output signal frequency becomes abnormally higher than the normal value, the counter 34 reaches its predetermined count value earlier than the counter 33, and the output signal of the counter 34 is applied to the set terminal S of the flip-flop 35 to set it. Simultaneously therewith, the output signal is applied through the OR circuit 36 to the clear terminals CL of the counters 33 and 34 and clears them.

As a result, the signal at the output terminal Q of the flip-flop 35 becomes "1". During non-braking, the output signal "1" is obtained from the output terminal 7, providing indication of a failure in the anti-skid controller.

By entering the output of the detector 22 into the counter 33 and the output of the detector 12 into the counter 34, in contrast to the foregoing description, a failure signal will be generated at terminal 7 in the case where the frequency of the wheel velocity signal is markedly lower than that of the vehicle velocity signal. In other words, where any failure occurs in the wheel velocity detector so that the output frequency becomes markedly lower than the normal value, or where any failure occurs in the vehicle velocity detector so that the output frequency becomes abnormally higher than the normal value, the failure is detected.

Figure 3:
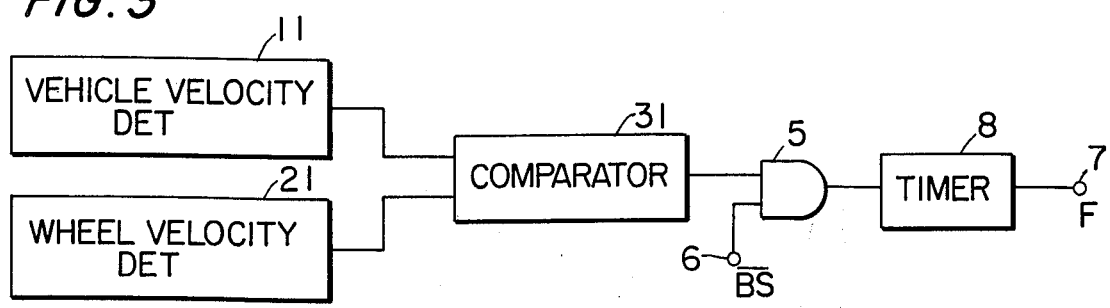
FIGS. 3 and 4 are circuit diagrams each showing still another embodiment of the failure detecting system according to this invention.

FIG. 3 shows still another embodiment of the failure detecting system according to this invention, in which a timer 8 is added to the circuit shown in FIG. 1. That is, the output of the AND circuit 5 in FIG. 1 is applied to the timer 8, and an output of the timer 8 is derived as the failure signal. The timer 8 is driven by the output "1" of the AND circuit 5 and provides a signal "1" a prescribed time later. If the output of the AND circuit 5 becomes "0" in the course of the lapse of the prescribed period of time, the timer will be reset.

Figure 5:
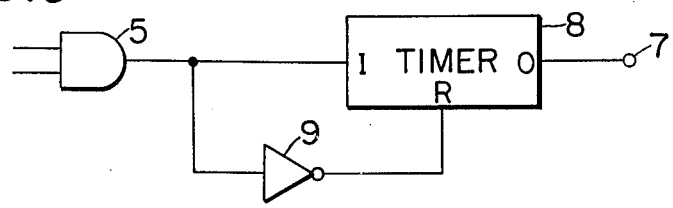
FIG. 5 is a circuit diagram showing a specific example of a part of the embodiment of FIG. 3.

More specifically, as illustrated in FIG. 5, the output signal of the AND circuit 5 is applied directly to an intput terminal I of the timer 8, while it is applied through an inverter 9 to a reset terminal R of the timer 8, so that a signal from an output terminal 0 of the timer 8 is taken out from the output terminal 7. Owing to the function of the timer 8, the output signal is obtained only when the failure signal is sustained for a fixed period of time. An accurate failure detection can therefore be carried out without the influence of failures of the detectors 12 and 22 and external noises occurring only for short periods of time. A proper set period of time of the timer 8 is usually 0.1–several seconds.

Figure 4:
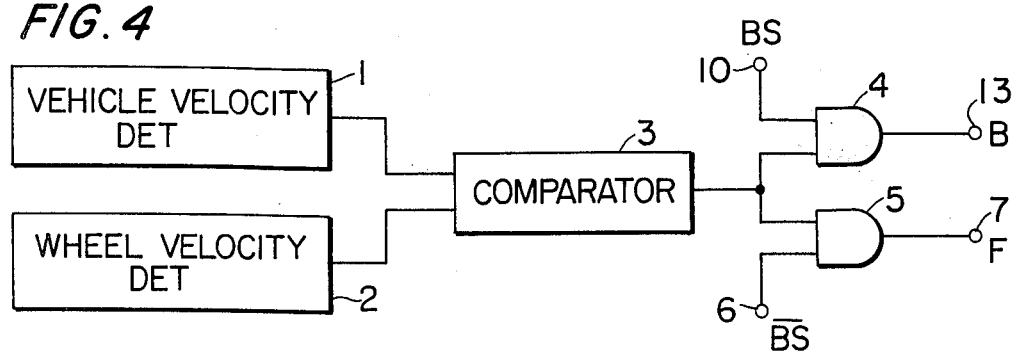

FIG. 4 shows a further embodiment of the failure detecting system according to this invention, which is used in common with a slip detecting circuit of an anti-skid controller.

As previously stated, the anti-skid controller of the prior art serves to detect whether the wheel velocity has decreased below a certain proportion predetermined relative to the vehicle velocity. On the other hand, similar failure detections are performed in the failure detecting systems illustrated in FIGS. 1 to 3. It is therefore possible to use the controller and the detecting system in common.

As shown in FIG. 4, a comparator 3 is provided to compare a vehicle velocity signal from a vehicle velocity detector 1 and a wheel velocity signal from a wheel velocity detector 2 and to produce an output signal "1" in the case where the wheel velocity signal becomes remarkably low in comparison with the vehicle velocity signal. The output of the comparator 3 is applied in common to respective inputs of AND circuits 4 and 5. A braking signal $\overline{BS}$ and a non-braking signal $\overline{BS}$ are also impressed on the AND circuits 4 and 5 from input terminals 10 and 6, respectively. Outputs of the AND circuits 4 and 5 as provided at output terminals 13 and 7 are used for the brake control and the failure detection, respectively.

In the circuit of FIG. 4, the timer as shown in FIG. 3 may be disposed at an output stage of the AND circuit 5.

It is needless to say that, in the circuits of FIGS. 2 and 3, the AND circuit 5 may be interposed between the detector and the comparator as previously suggested in connection with FIG. 1.

In this way, where the failure signal is obtained from the output terminal 7, the driver may be informed of the fact by such means as a display device and/or an alarm device, whereby the driver may stop the automobile by the use of a foot brake or an auxiliary brake (side brake) and perform an inspection of the controller. Alternatively, a power supply to the anti-skid controller may be turned "off" by the failure signal so as to prevent the controller from operating, and the automobile may then be driven without automatic brake control.

As set forth above, according to this invention, it is possible to detect failure of the vehicle velocity and wheel velocity detectors, and in this way, the dangers of uncontrolled skid of the wheel and runaway of the vehicle are avoidable.

It is a matter of course that this invention is not restricted to the foregoing examples, but that a variety of modifications can be considered within the scope of the appended claims.

What is claimed is:

1. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, and logical means responsive to receipt of said output signal of said comparison means and said condition signal from said signal means for generating a failure signal, wherein said vehicle velocity detector and said wheel velocity detector comprise means for providing pulse signals having frequencies proportional to said vehicle velocity and said wheel velocity, respectively, and wherein said comparison means comprises first and second counting means responsive to the pulse signals from said vehicle velocity detector and said wheel velocity detector, respectively, for providing outputs when the count values thereof reach predetermined values different from each other, respectively, and output means for generating said comparison output signal in response to the output of one of said counting means and to prevent said comparison output signal from being generated in response to the output of the other counting means.

2. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, and logical means responsive to receipt of said output signal of said comparison means and said condition signal from said signal means for generating a failure signal, wherein said vehicle velocity detector and said wheel velocity detector comprise means for providing pulse signals having frequencies proportional to said vehicle velocity and said wheel velocity, respectively, and wherein said comparison means comprises two counters which count the pulse signals of said vehicle velocity detector and said wheel velocity detector, respectively, and which provide outputs when the count values reach predetermined values different from each other, respectively, a flip-flop which is set and reset by said outputs of respective ones of said two counters, and which generates an output signal in response to said outputs, and an OR circuit connected to said counters to clear both said counters in response to the output of either of said counters.

3. The failure detecting system according to claim 2, wherein said logical means comprises an AND circuit which provides a logical product between the output signal of said flip-flop and said condition signal from said signal means.

4. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, logical means responsive to receipt of said output signal of said comparison means and said condition signal from said signal means for generating a failure signal, and timer means for providing an output when said failure signal from said logical means has continued for a predetermined period of time.

5. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, logical means responsive to receipt of said output signal of said comparison means and said condition signal from said signal means for generating a failure signal, wherein said logical means comprises an AND circuit which generates said failure signal corresponding to a logical product between said comparison output signal from said comparison means and said condition signal from said signal means, and timer means connected at an output of said AND circuit to provide an output when said failure signal from said AND circuit has continued for a predetermined period of time.

6. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, logical means responsive to receipt of said output signal of said comparison means and said condition signal from said signal means for generating a failure signal, wherein said logical means comprises an AND circuit which generates said failure signal corresponding to a logical product between said comparison output signal from said comparison means and said condition signal from said signal means, and second signal means for generating a braking signal representative of actuation of the vehicle brakes, and a second AND circuit connected to said comparison means for generating a braking control signal corresponding to the logical product between said braking signal from said second signal means and said comparison output signal of said comparison means.

7. A failure detecting system for detecting failure in an automatic brake control system for vehicles, comprising a vehicle velocity detector which provides a vehicle velocity signal proportional to detected vehicle velocity, a wheel velocity detector which provides a wheel velocity signal proportional to detected wheel velocity, comparison means responsive to said vehicle velocity signal and said wheel velocity signal from said vehicle velocity detector and said wheel velocity detector for generating a predetermined comparison output signal when a difference between said signals of said detectors exceeds a predetermined value, signal means for generating a condition signal representative of non-actuation of the vehicle brakes, and logical means responsive to receipt of said output signal of said comparison means and said condition signal from said signal means for generating a failure signal, wherein said vehicle velocity detector comprises a speed meter employing a Doppler system, and said wheel velocity detector comprises a tachometer.

* * * * *